United States Patent
Lurey et al.

(10) Patent No.: US 9,294,476 B1
(45) Date of Patent: Mar. 22, 2016

(54) USER-DEFINED IDENTITY VERIFICATION SYSTEM

(71) Applicant: Keeper Security, Inc., Chicago, IL (US)

(72) Inventors: Craig Lurey, El Dorado Hills, CA (US); Darren Guccione, Chicago, IL (US)

(73) Assignee: Keeper Security, Inc., Chicago, IL (US)

( * ) Notice: Subject to any disclaimer, the term of this patent is extended or adjusted under 35 U.S.C. 154(b) by 0 days.

(21) Appl. No.: 14/625,021

(22) Filed: Feb. 18, 2015

(51) Int. Cl.
  *H04L 29/06* (2006.01)
  *H04W 12/06* (2009.01)
(52) U.S. Cl.
  CPC ........ *H04L 63/0861* (2013.01); *H04L 63/0492* (2013.01); *H04L 63/0838* (2013.01); *H04L 63/0853* (2013.01); *H04L 63/101* (2013.01); *H04W 12/06* (2013.01)
(58) Field of Classification Search
  CPC .................................................. H04L 63/0861
  USPC ........................................................ 713/172
  See application file for complete search history.

(56) References Cited

U.S. PATENT DOCUMENTS 8,943,561 B2 * 1/2015 Foster .................. H04W 12/06
  713/168

* cited by examiner

*Primary Examiner* — Longbit Chai

(57) ABSTRACT

A system and application for providing a user authentication or verification of a user identity are provided. A primary log in factor is created by a user. In addition, one or more smart devices associated with the user are verified by the user to create a list of user authentication devices. Upon a request for user authentication, a combination of the correct primary log in factor and a determination that the user is within the vicinity of at least one of the user authentication devices on the list are used to determine the authenticity of the user. A user authentication may be used to unlock a secured application on a user device or to authenticate a transaction with a third party. Methods and machine-readable medium for user authentication are also provided.

32 Claims, 18 Drawing Sheets

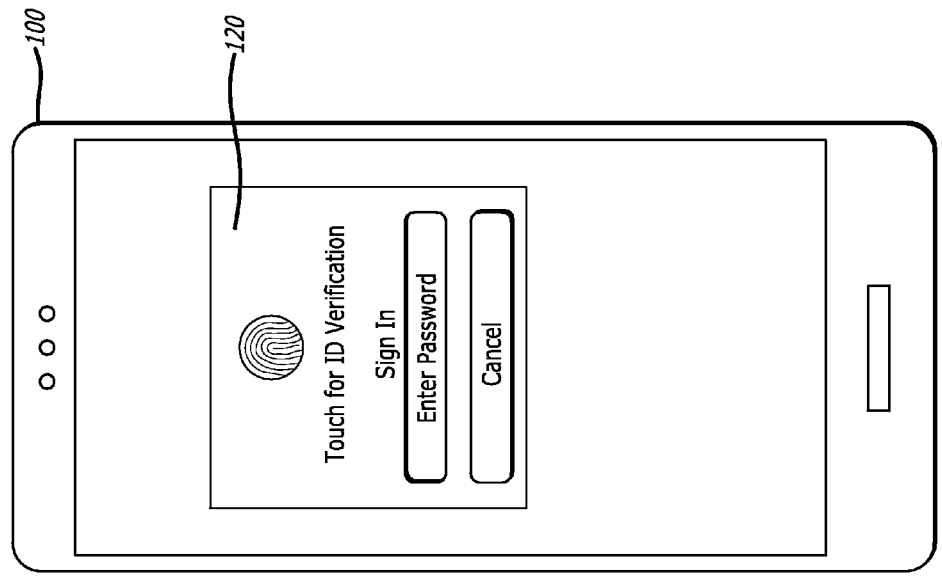
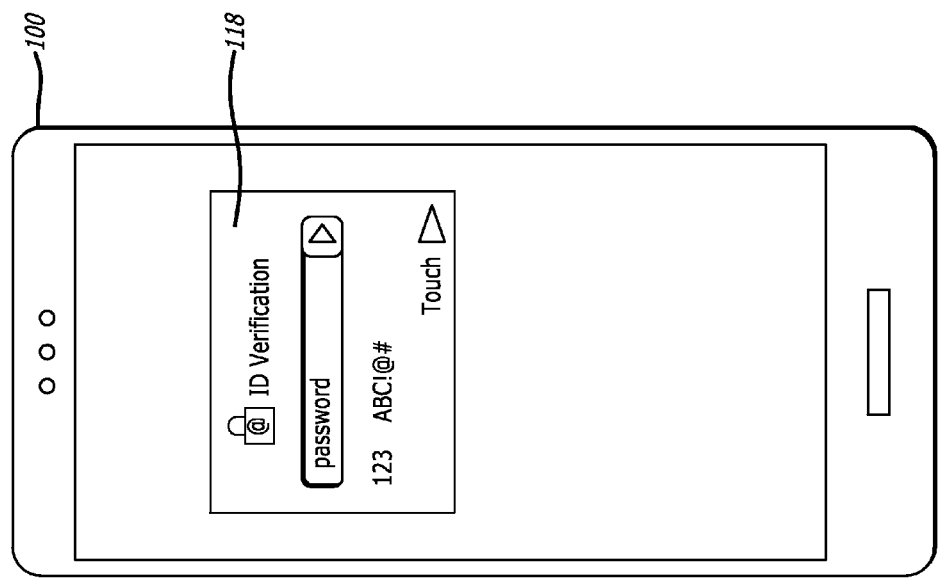

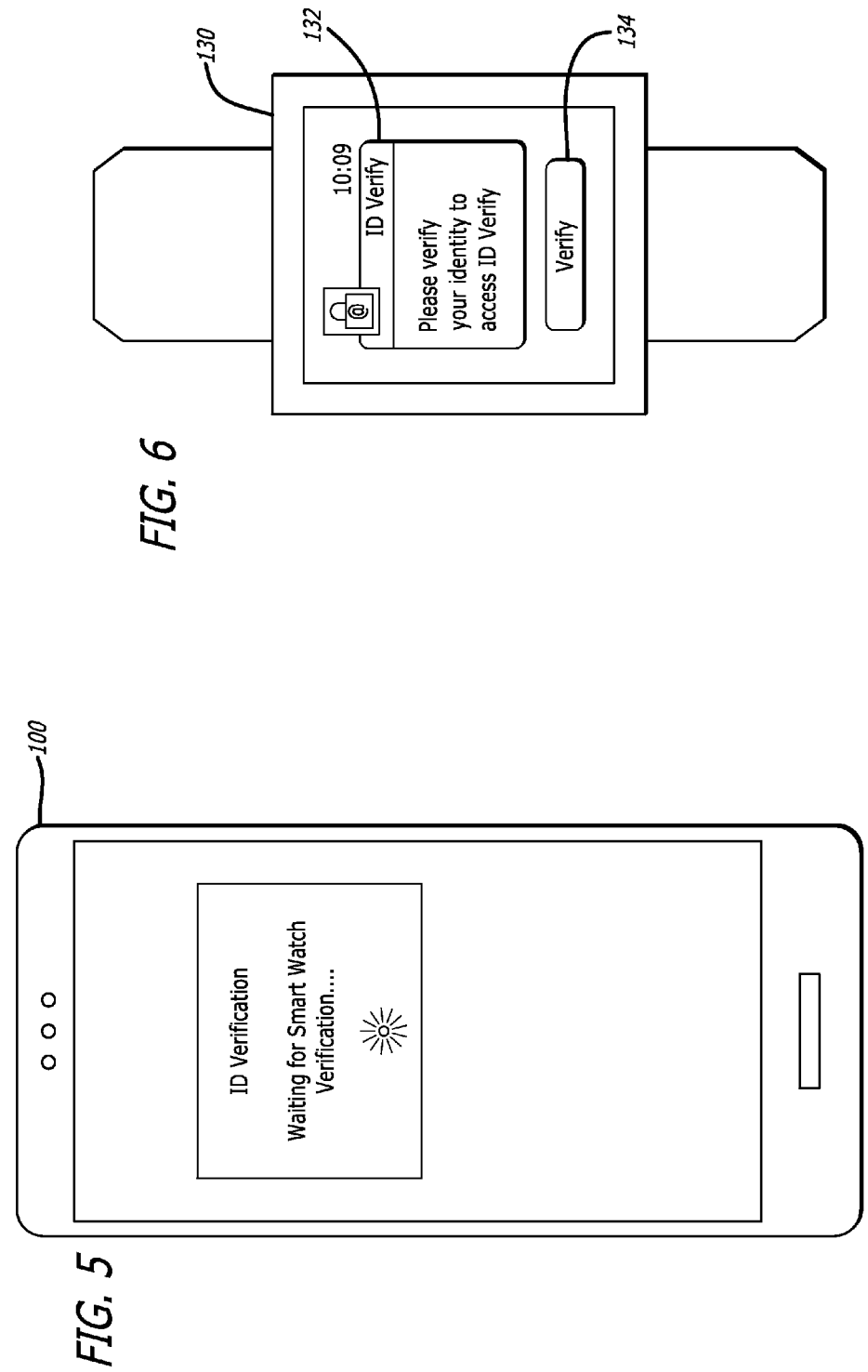

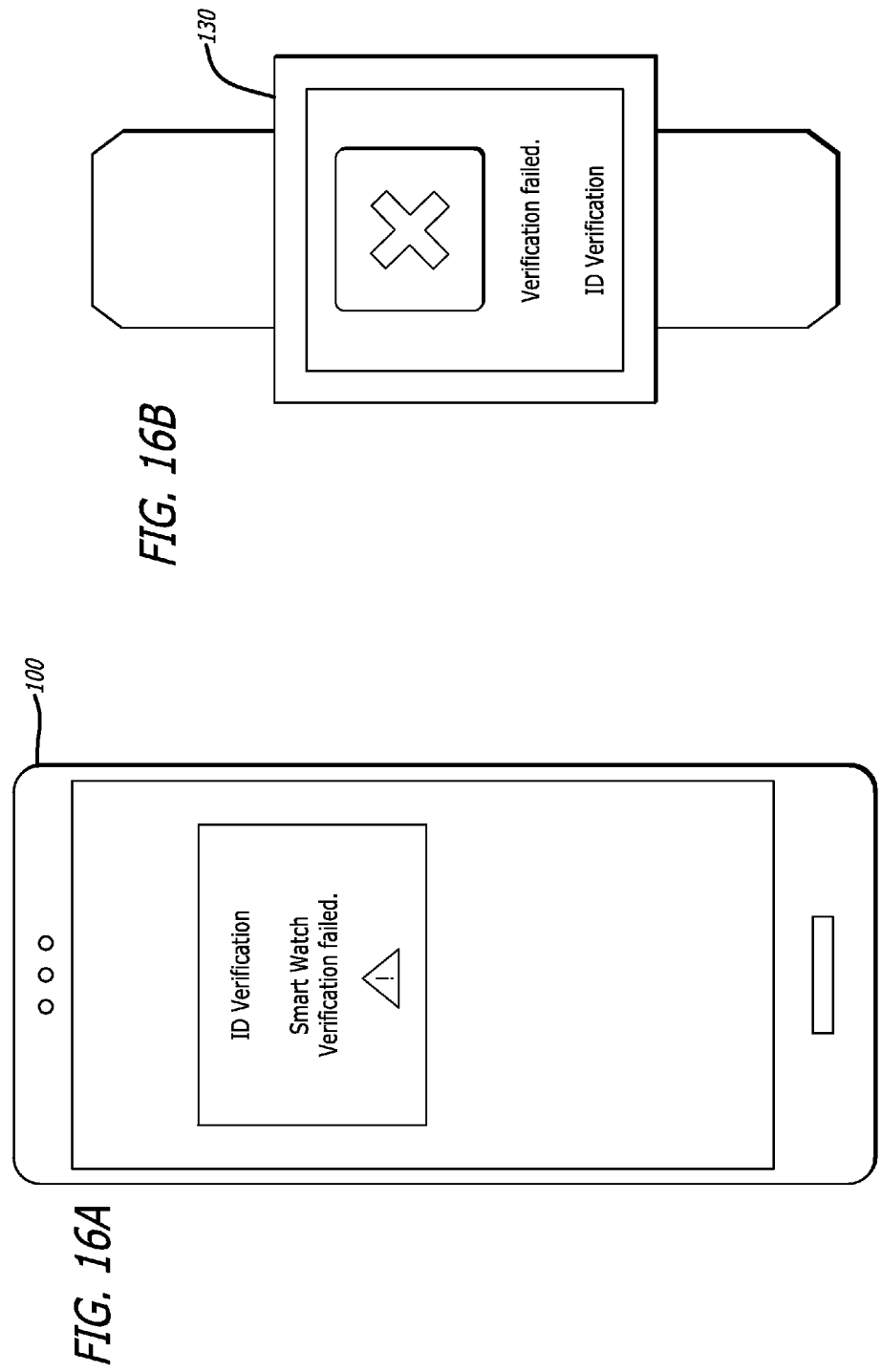

USER-DEFINED IDENTITY VERIFICATION SYSTEM

CROSS-REFERENCE TO RELATED APPLICATIONS

None

TECHNICAL FIELD

The present disclosure generally relates to authenticating a user, and, in particular, to a user defined identity verification system that utilizes various forms of identification factors available to the user through one or more wireless devices in the vicinity of the user.

BACKGROUND

Protecting against cybercrime and cyber-terrorism is extremely important. Consumers and businesses are subject to security intrusions where their passwords, bank information, social security numbers and other private information are being stolen. The challenge of protecting a user's identity and authenticating a user with third party applications like email, banking websites and social media sites is becoming increasingly difficult.

Two-factor authentication is a common way of protecting a user when he or she is logging into a system that requires elements such as a username and password. Two-factor authentication requires the use of a second factor in addition to a first factor, where the first factor is typically a user's password, to log into third-party applications. With traditional two-factor authentication techniques, the second factor typically consists of a numeric code that is either sent to a user via SMS or provided to a user through a soft or hard token (e.g., a key fob which contains a numeric display).

Traditional two-factor techniques, however, are often cumbersome for the user since they require the user to engage in an additional manual input step to authenticate with the third party application (e.g., manual entry of the key code from the token into the input screen of the application) in addition to entering the username and password, in order to gain access to the application. Often, two-factor techniques require a user to carry an additional "token" or device to display the second factor. However, this method is inconvenient and cumbersome since it reduces the convenience of the user and increases the amount of time required to gain access into a user's applications. Another method of two-factor authentication is with the use of biometrics. Under this method, a user's second factor may consist of a fingerprint, a retina/eye, voice or facial recognition techniques—instead of using a passcode from a soft or hard token. However, biometric authentication techniques are subject to reliability issues and have hardware limitations since this technique can only be utilized on devices that support biometric measurements and authentication software.

Accordingly, it is desirable to provide a user defined identity verification system and method that provides security, but which overcomes the deficiencies of the prior art.

SUMMARY

According to one embodiment, the disclosed subject technology relates to a user authentication system. The system includes a user authentication server, a user device, a user authentication device, and a user authentication application. The user authentication application includes instructions for causing the server, the user device and the user authentication device to execute a method for providing authentication of a user. In one embodiment, the method includes inputting, on the user device, a log in request and a primary log in factor; sending, from the user device, the log in request and primary log in factor to the user authentication server; sending, from the user authentication server, a push notification to the user authentication device; sending, from the user authentication device, a token to the user authentication server; and, sending, by the user authentication server, a user authentication if the token is acceptable.

According to another embodiment, the disclosed subject technology relates to a user authentication system that includes one or more processors, one or more storage memories and a user authentication module comprising instructions for causing the one or more processors to execute a method for providing authentication of a user. In one embodiment, the method comprises receiving, by one or more processors, a primary log in factor to be associated with a user; receiving, by one or more processors, verification of one or more smart devices to be associated with the user; determining, by one or more processors, a user identification list of one or more verified smart devices associated with the user; receiving, by one or more processors, a request for authentication of the user; determining, by one or more processors, if one or more of the smart devices on the user identification list are within a defined vicinity of the user; and, providing, by one or more processors, a user authentication if the a primary log in factor provided with the request for authentication matches the primary log in factor associated with the user and one or more of the smart devices on the user identification list are within a defined vicinity of the user.

According to another embodiment, the disclosed subject technology relates to a verification process for new smart device. The verification process comprises receiving, by a user authentication application, a request to enable a new smart device; receiving, by the user authentication application, a code from the server; receiving, by the user authentication application, a device authenticator from the new smart device after the user has verified the new smart device; receiving, by the user authentication application, confirmation from the server that a two factor authentication is complete; and, saving, by the user authentication application, the device authenticator.

It is understood that other embodiments and configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

To understand the present disclosure, it will now be described by way of example, with reference to the accompanying drawings in which embodiments of the disclosures are illustrated and, together with the descriptions below, serve to explain the principles of the disclosure. As will be realized, the subject technology is capable of other and different configurations and its numerous details are capable of modification in various other respects, all without departing from the scope of the subject technology. Accordingly, the drawings and detailed description are to be regarded as illustrative in nature and not as restrictive.

FIG. 3 illustrates another example feature of a user authentication system.

FIG. 4 illustrates another example feature of a user authentication system.

FIG. 5 illustrates another example feature of a user authentication system.

FIG. 6 illustrates another example feature of a user authentication system.

FIG. 16A illustrates another example feature of a user authentication system.

FIG. 16B illustrates another example feature of a user authentication system.

DETAILED DESCRIPTION

Figure 2:
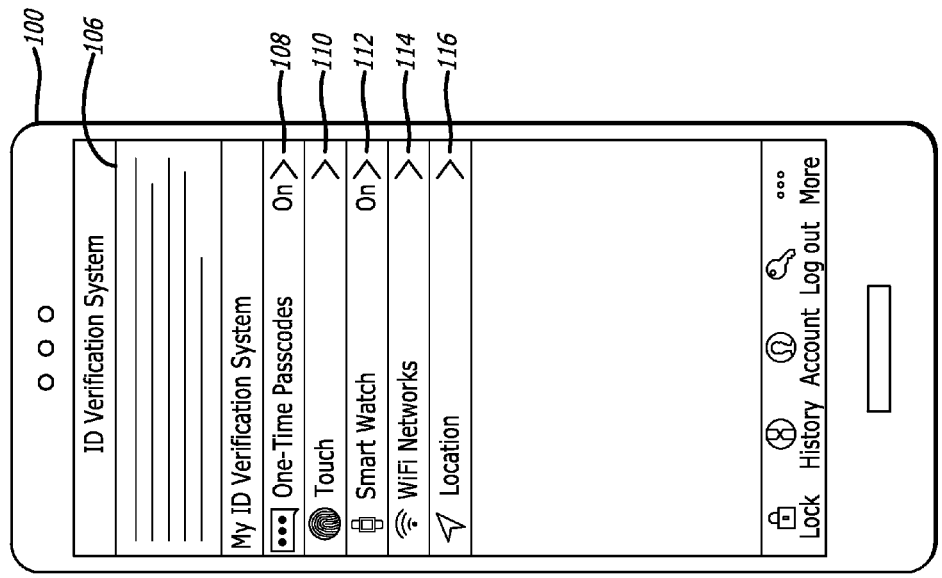
FIG. 2 illustrates another example feature of a user authentication system.

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated. Thus, in the following detailed description, numerous specific details are set forth to provide a full understanding of the subject technology. It will be apparent, however, that different aspects of the subject technology may be practiced without some of these specific details, and that other details may be varied. In other instances, well-known structures and techniques have not been shown in detail so as not to obscure the disclosure.

Human DNA is a unique strand of molecules that define an individual person. Likewise, the present disclosure may be thought of as authentication DNA, where each "molecule" on the "DNA strand" is a physical element of the user's body or a wireless device (e.g., fitness wristband, smart watch, smart TV, smart thermostat, smart lightbulb, smartphone, fingerprint, retinal scan, and the like). These physical elements, individually and in the aggregate, create a unique set of authentication elements for the user-defined authentication system. Here, user authentication is defined as verification of a user identity (e.g., verifying that a user is who the user is presented to be). With a user-defined authentication system, continuously authenticating a user with traditional two-factor methods is not necessary, as the authentication system authenticates the user automatically. Thus, there is greater convenience for the user while maintaining a high level of security.

In one aspect of the disclosure, an authentication system may be used to authenticate a user for a specific authentication application. For example, the specific authentication application may be an authentication application run on a specific authentication server or set of servers. In other aspects, the authentication system may be used to authenticate users across any application (e.g., software programs, in store merchant transactions, social media sites, and the like).

The authentication system may use multiple Internet of Things (IoT) devices to authenticate a user. For example, the authentication system may use one or more of a combination of a specific user's smartwatch, fitness wristband, Wi-Fi thermostat, smart light, Wi-Fi TV, Bluetooth low emission (LE) key fob, etc., to create a unique identity for the authentication user. Afterwards, anytime the user needs to be authenticated for a particular task or transaction, if the user is within the vicinity of at least one of the IoT devices, the user is automatically authenticated. On the other hand, if none of the IoT devices associated with the user are within a particular area of the user, then the authentication system utilizes a fallback method of authentication (e.g., Text Message (SMS) codes, automated voice calls, biometric factors (voice, facial, fingerprint)).

In one aspect of the disclosure, each IoT device emits a wireless signal (e.g., Bluetooth LE signal) that may be detected by an authentication application on the user's device (e.g., smartphone, tablet computer, laptop computer, desktop computer) when the user launches the authentication application. If the detected wireless IoT signal is registered or located on an authentication system list, the detected IoT signal is determined to be the second factor used to identify and authenticate the user when the user logs into their authentication application.

Authentication elements may include wireless signals from close proximity devices, elements of the human body, physical location of the user, and the like. For example, authentication wireless signals may be provided by wearable devices (e.g., watch, fitness band), Wi-Fi networks (e.g., the user's home Wi-Fi network), transmitters (e.g., radio frequency identification device (RFID), near field communications (NFC), Bluetooth and Bluetooth Smart (LE), ZigBee, HomeRF, and the like), etc. As another example, authentication elements of the human body may be provided by any of a fingerprint (e.g., phone touch ID), facial recognition, retina scan, voice recognition, heartbeat recognition, and the like).

In one aspect of the disclosure, a user may register and/or set up an authentication process that is associated with the user. For example, the user may log into an authentication system or application with a primary log in factor (e.g., the user's master password, a security pattern, a biometric factor) and then enter a setup screen. The user may turn on one or more non-transmitting authentication elements based on the available functionality of the user's authentication receiver, such as the user's Smartphone. For example, the non-transmitting authentication elements may include a text message, a fingerprint scan, and/or facial recognition. The user may also select from a list of trusted devices associated with the user, such as wearable devices, Bluetooth transmitters, Wi-Fi networks, ZigBee, and/or other RF emitting devices. Here, the trusted device may or may not request authorization from the user, depending on the capabilities of the device. For example, the trusted device may store a token generated by the authentication server on the device for subsequent authorization requests.

In other aspects of the disclosure, a geographic location may be associated with certain trusted devices. Here, not only would the trusted device itself need to be detected for authentication, but the trusted device would need to be located at the geographic location as well. Also, an auto logout timer may be associated with a user's authentication application. Here, a user may be able to extend the auto logout timer when an authentication element is detected. In addition, a trusted device may transmit an authorization request to the server for token generation and storage.

The authentication system or application may be provided that includes only one trusted device, or alternately multiple trusted devices may be provided. For example, the more trusted devices that are used to define a user, the greater the convenience for the user. As an illustrative example, a user may select the user's home smart lights as one trusted device and the user's office Bluetooth headset as another trusted device. Thus, the user may be automatically authenticated when the user is either within a threshold vicinity of the user's home or within a threshold vicinity of the user's workplace. In another example, the user may select a trusted device that is typically always with the user (e.g., smartwatch, smartphone), wherein as long as the signal of the trusted device can be detected, the user may be automatically authenticated.

The authentication system or application may be accessed by the user's device, such as the user's smartphone, tablet computer or desktop computer, for example. To gain access, the user may tap or open the authentication application on the user's device. The authentication system then scans for any wireless beacons or signals from the authentication registered (e.g., trusted) devices. The authentication server may also transmit a message directly to the authentication registered devices via a push notification or other delivery mechanism. The user may be prompted to enter a primary log in factor such as a master password unless the user has selected to bypass password entry for a specified period of time, for example. The authentication registered device may either automatically respond with a stored verification token or may request a new token from the authentication server. A further level of security may be provided by prompting the user to manually authorize the login attempt from the user's device.

Upon successful authentication from the authentication registered device and successful entry of the user's master password, the user may by authenticated and logged into the application the user is trying to open.

In the case where the user is not able to authenticate through an authentication registered device, the user may be routed to a secondary two-factor authentication. For example, this process may be utilized for web browser access methods in which the browser is unable to use the wireless capabilities of the user's device (e.g., local computer). Thus, users may choose a traditional two-factor authentication method as a fallback scenario.

An aspect of the disclosure is a high level of the user's security. For example, the authentication registered devices may require close proximity to the user device being used to log into the authentication application or system. This may provide great difficulty for a hacker to gain access to the user's authentication account since hacker's are generally located in a remote location that is outside the authentication device beacon range. For example, a hacker may have obtained a user's master password, but if the hacker's computer device is not located within the vicinity of any of the user's trusted devices, the hacker will not be able to obtain authentication on the authentication system. The security may be taken further to prevent an attacker from copying and rebroadcasting a device identifier of a known authentication signal.

Another aspect of the disclosure relates to an authentication application programming interface (API), which may be a service that provides for a third party (e.g., bank, credit agency, social network, merchant) to verify a user's identity through matching a transaction request with a factor contained in a user's authentication profile. For example, if a bank would like to verify a user's identity to complete a banking transaction, the bank may use an authentication public developer API to request authorization and thereby receive authorization from the user. In this example, the bank may send a request to the user for the user to verify the user's identity. The user may receive a message via the authentication system and reply "Yes" to the message. An authentication API match process is initiated by the bank, and a response is received by the bank. Accordingly, if the match is confirmed, the bank may approve the transaction, and conversely, if the match is not confirmed, the bank may deny the transaction.

In another example, the user may select to use an authentication system/application to validate the user's identity with a retailer. In one embodiment, the selection is made from the retailer's account profile screen. If a need arises for authentication or verification, the retailer sends an approval request to the authentication user. The request may include a customizable string in the message. For example, the customizable string may ask "Do you approve the transaction from the retailer?" or "Your account was recently accessed from another country. Is that you?"

Continuing the example, authentication servers may generate a one-time token that expires in a specified amount of time, and send the generated token to the authentication connected device. Based on the user's profile, the user may get a notification to one of the user's devices (e.g., the currently connected device, a different user device, etc.). If the notification is a text message, the user may reply with an affirmative indication (e.g., "Yes"). The notification may also generate or provide an affirmative indication button or link on the user's device (e.g., a "Yes" button on a notification screen of a smartwatch). The authentication connected device may then send an authenticated response to an authentication server with a temporary transaction token plus an authentication token. The authentication system back-end may receive the approval and forward the approval (e.g., push request to the third party, HTTP response on the same socket connection, etc.). The third party provider (e.g., the retailer) may approve or deny the transaction request to the user based on the information.

Figure 1:
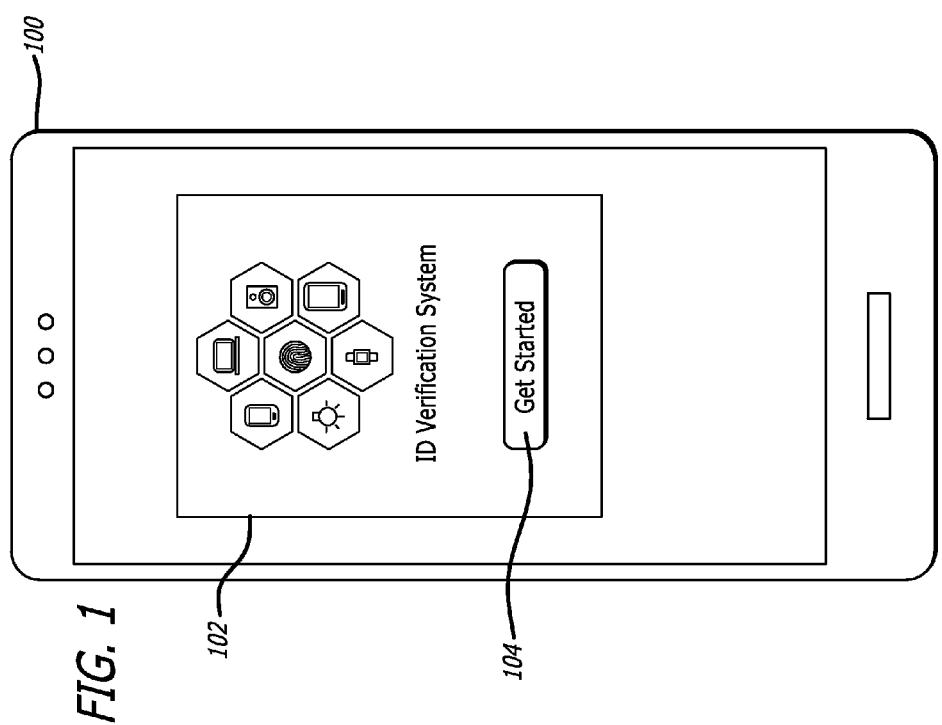
FIG. 1 illustrates an example feature of a user authentication system.

Turning to the Figures, a user authentication system is disclosed. As illustrated in FIG. 1, a user authentication application may be downloaded and installed on a user device 100 (e.g., smartphone, tablet computer, laptop computer, desktop computer, smartwatch). In FIG. 1, the user device 100 is shown as a smartphone. The user authentication application may be launched or run on the user device 100 so that user-definable parameters may be set. For example, launching the user authentication application may provide a getting started window 102 to be displayed on the user device 100, where the getting started window 102 includes a get started selector or button 104.

The user authentication application may have a main or home screen 106, as shown in FIG. 2. The main screen 106 may provide different options for setting up or reconfiguring a user-definable user authentication. For example, FIG. 2 illustrates a main screen 106 having a one-time passcode selector 108, a biometric authentication selector 110 (e.g., touch ID), a smart watch selector 112, a Wi-Fi network selector 114, and a location selector 116. Additional selectors may also be provided. The user may be prompted by a master password screen 118 to set up a master password for the user authentication application, as shown in FIG. 3. The user may also set up a biometric factor (e.g., fingerprint, facial recognition, voice recognition) to be used in lieu of or in addition to the master password. For example, FIG. 4 illustrates a touch ID screen 120 through which the user may enter the user's master password and scan the user's fingerprint for access to the user authentication application.

Figure 7:
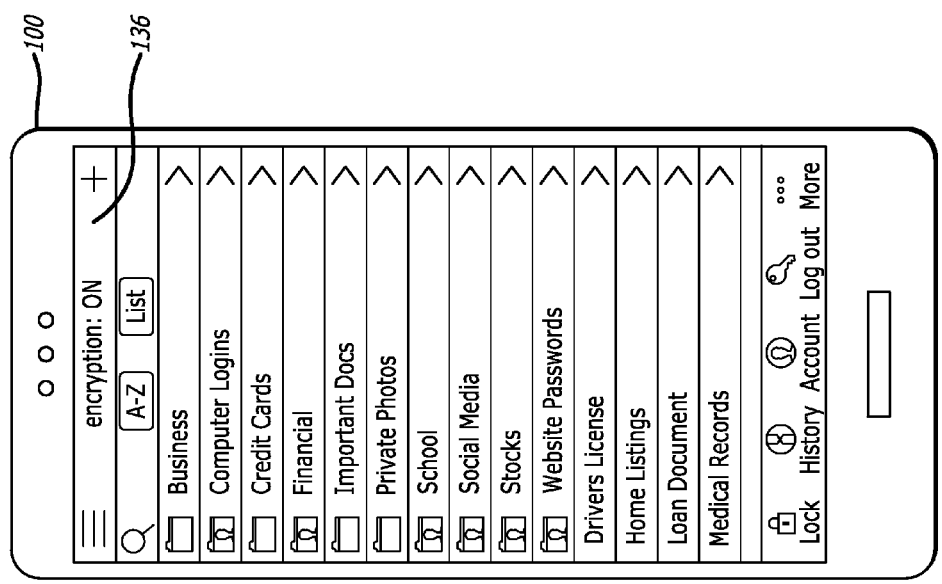
FIG. 7 illustrates another example feature of a user authentication system.
Figure 8:
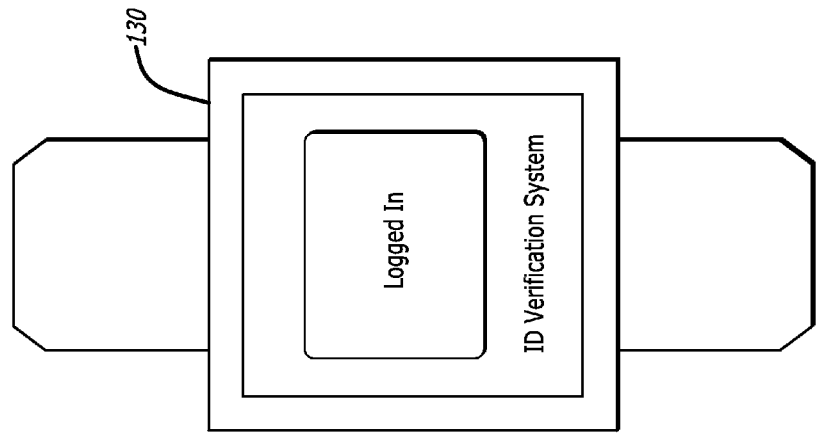
FIG. 8 illustrates another example feature of a user authentication system.

FIGS. 5 and 6 illustrate an authentication or verification of the user based on an associated user authentication device 130 (e.g., smart watch, smart TV, smart light bulb, smart thermostat, etc.). For example, the user authentication device 130 shown in FIG. 6 is a smart watch. In the current example, once the user has entered a valid master password and/or a valid fingerprint scan (i.e., a first factor), the user authentication application looks for a second factor, such as a verification from the user's smart watch. For example, the smart watch may display a verification screen 132 with a verification selector 134 (e.g., a verify button), which the user may touch or press to verify the user wishes to gain access to or unlock a secured application (e.g., a vault). Once the user is verified through the smart watch 130, a secured application screen 136 (e.g., main or home screen) may be displayed on a user device 100, such as the user's smartphone as illustrated in FIG. 7. As shown in FIG. 8, the user authentication device 130, here the smart watch may display confirmation that the user is currently logged in to the secured application.

Figure 10:
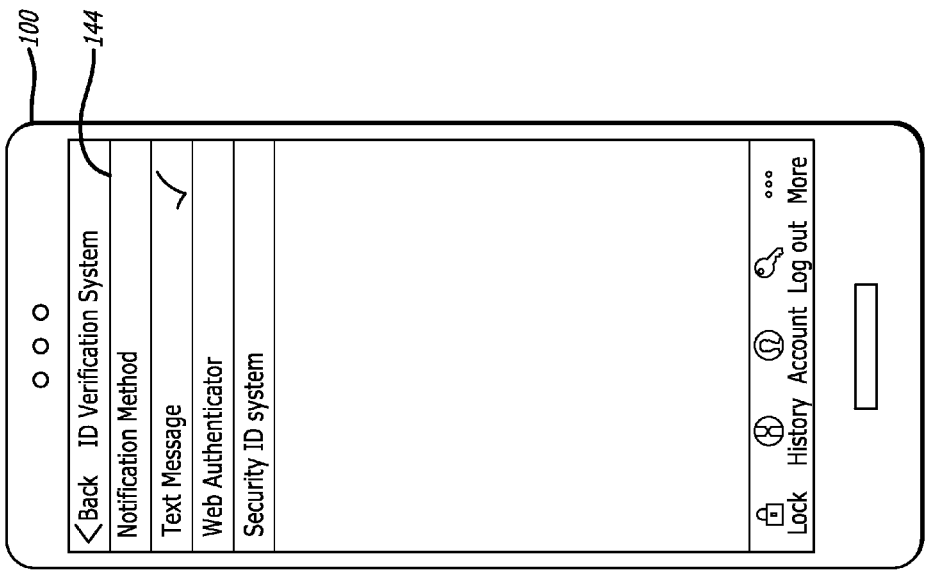
FIG. 10 illustrates another example feature of a user authentication system.
Figure 9:
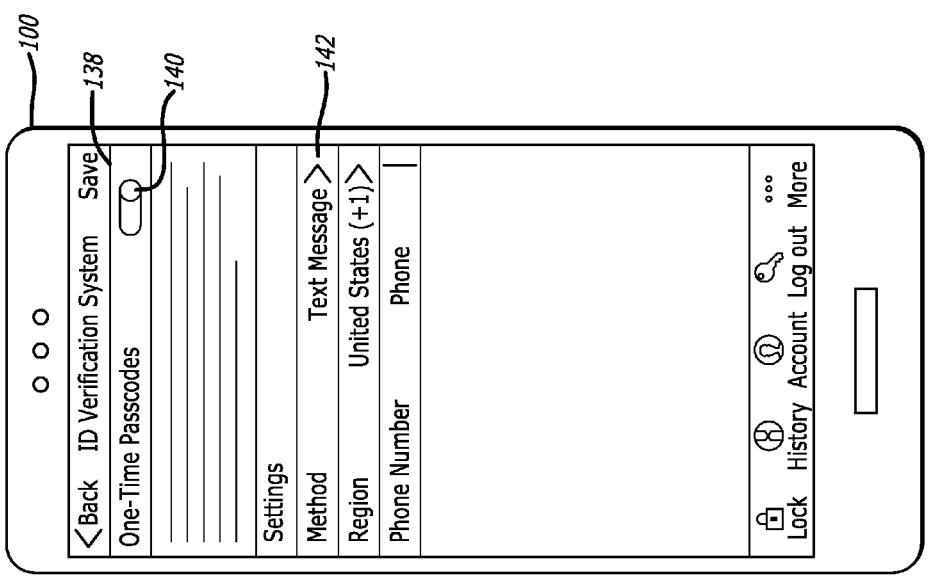
FIG. 9 illustrates another example feature of a user authentication system.

As illustrated in FIGS. 9 and 10, a one-time passcode option may be used with the user authentication application. For example, the user may select the one-time passcode selector 108 on the main screen 106, which provides a one-time passcode screen 138 on the user device 100. Here, the user may enable or disable the one-time passcode option with an on-off selector 140. The one-time passcode screen 138 may also provide a method selector 142, through which the user may be provided a method selection screen 144 to select the method or mechanism by which the one-time passcode will be communicated to the user. For example, a text message, a voice call, a vendor authentication application (e.g., vendor specific application for authentication), a vendor authentication device (e.g., an electronic security key fob), and the like may be used to provide the one-time passcode to the user. In the example shown in FIGS. 9 and 10, the user has selected text messaging. The one-time passcode screen 138 may also provide an indication of the geographic region supported by the user's wireless cellular or data plan, as well as the phone number of the device that the text message is to be sent to.

Figure 12:
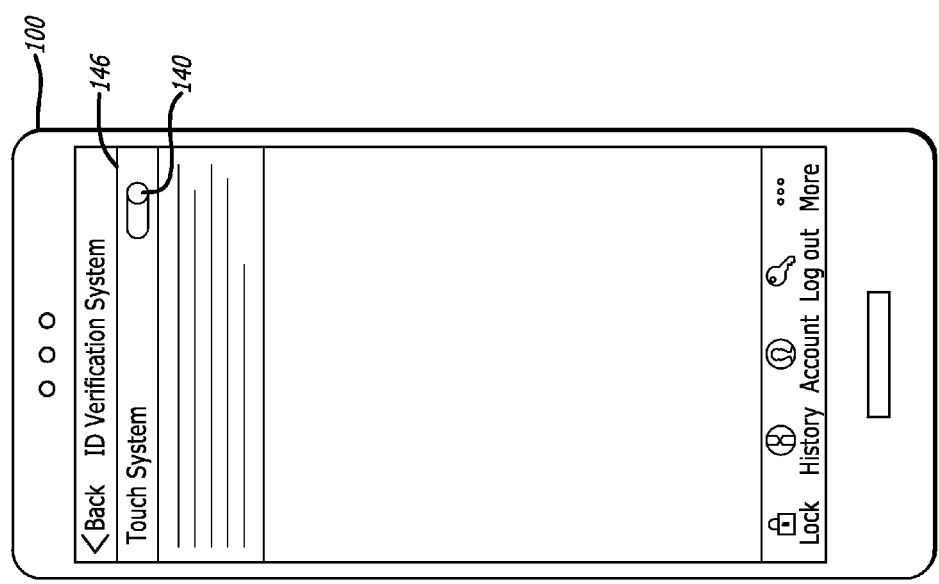
FIG. 12 illustrates another example feature of a user authentication system.
Figure 11:
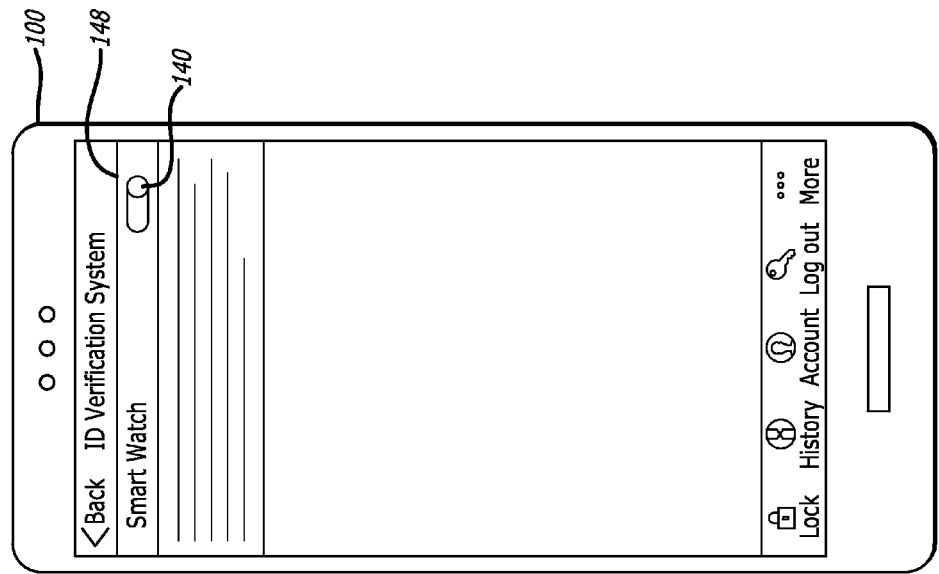
FIG. 11 illustrates another example feature of a user authentication system.

As shown if FIG. 11, a biometric selection screen 146 (e.g., touch ID screen) may be displayed to provide the user a way to turn the biometric authentication on or off using an on-off selector 140. For example, the user may select the biometric authentication selector 110 on the main screen 106 to display the biometric selection screen 146. Similarly, a user may select the smart watch selector 112 on the main screen 106 to display a smart watch selection screen 148, which is shown in FIG. 12. Again, the user may user an on-off selector 140 to turn the smart watch selection on or off.

Figure 13:
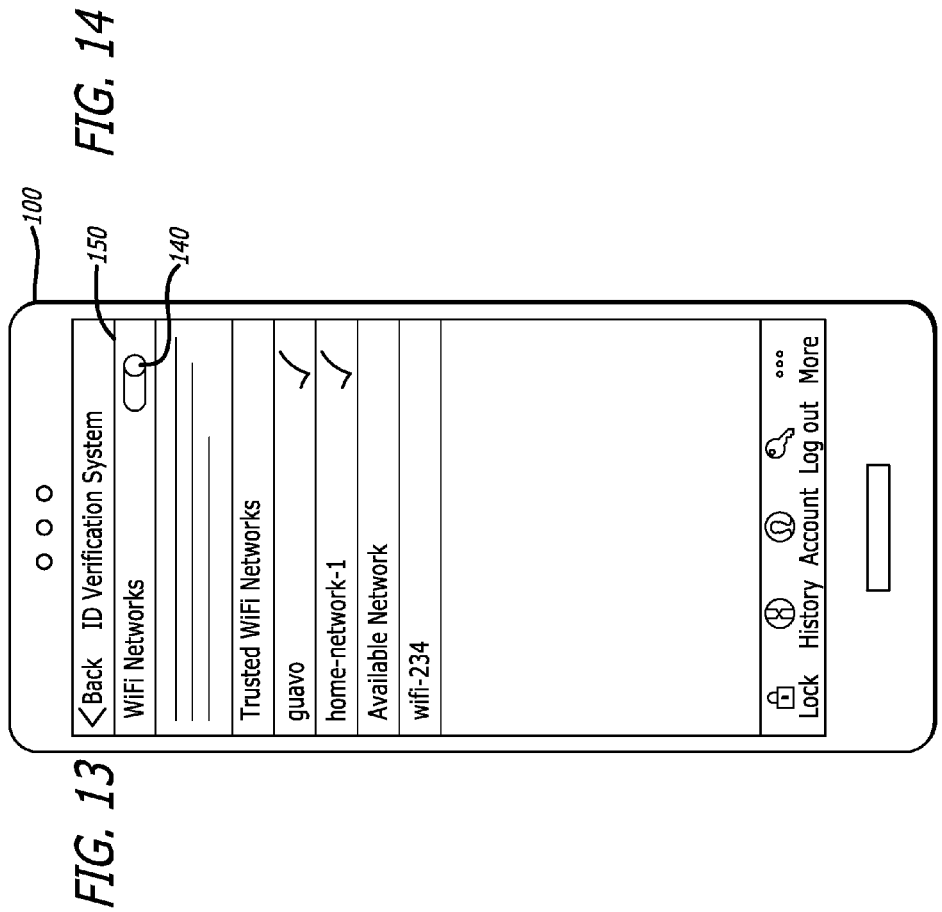
FIG. 13 illustrates another example feature of a user authentication system.
Figure 15A:
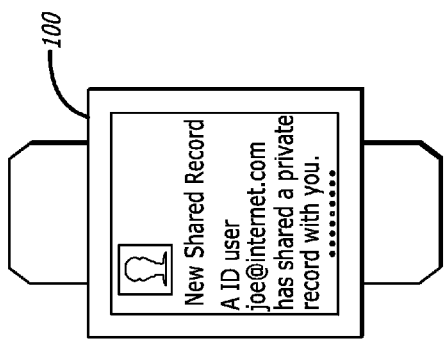
FIG. 15A illustrates another example feature of a user authentication system.
Figure 15B:
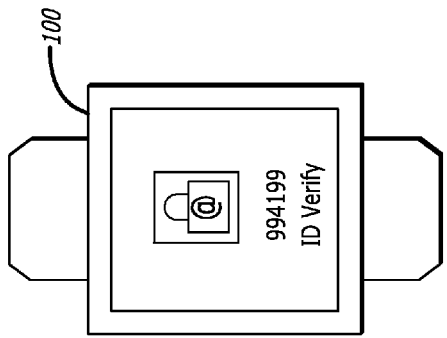
FIG. 15B illustrates another example feature of a user authentication system.
Figure 15C:
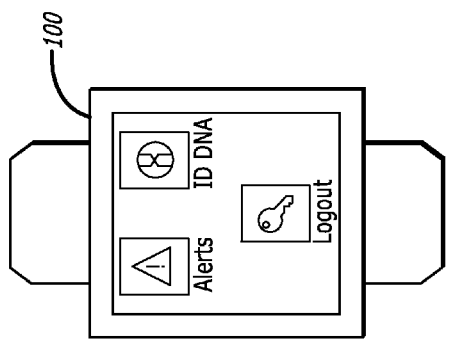
FIG. 15C illustrates another example feature of a user authentication system.
Figure 15D:
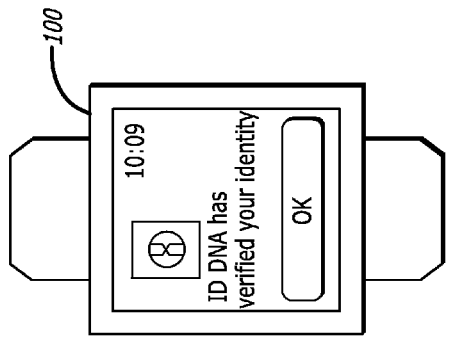
FIG. 15D illustrates another example feature of a user authentication system.

FIG. 13 illustrates a Wi-Fi selection screen 150 that may be displayed when the user selects the Wi-Fi network selector 114 on the main screen 106. In the illustrated example, the Wi-Fi networks "guavo" and "home-network-1" have been selected for use in user authentication by the user authentication application or system. Conversely, in this example, the available Wi-Fi network "Wi-Fi-234" has not been selected by the user as a trusted network.

Figure 14:
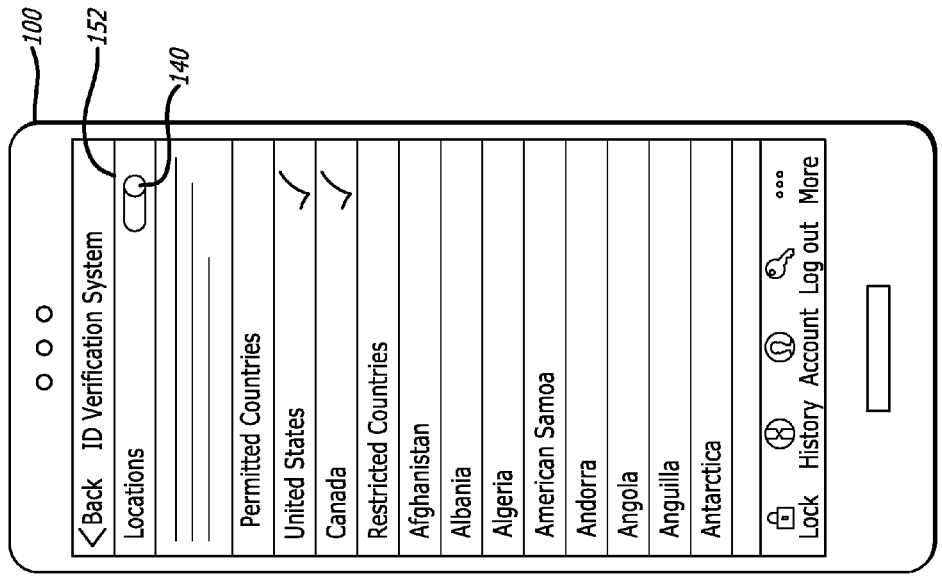
FIG. 14 illustrates another example feature of a user authentication system.

Another layer of security may be provided by selecting locations for which the user authentication may be accepted. For example, as shown in FIG. 14, a location selection screen 152 may be displayed when the user selects the location selector 116 on the main screen 106. In this example, only the countries "United States" and "Canada" have been selected. Thus, the user will only be able to access the secured application within the United States or Canada, while attempts to access the secured application from or while in any other country will be denied.

FIGS. 15A-15D illustrate an example of a user authentication or verification using the user authentication system. Here, the user receives a message on a user device 100 (e.g., user's smart watch) where the message provides a shared private document from a sender. The user authentication application steps through one or more of the above-identified authentication steps to automatically authenticate the user to allow the user to open the private document.

FIGS. 16A and 16B illustrate an example of when a user authentication device 130 fails to provide authentication of the user. In this example, the user authentication device 130 is a smart watch and the user device 100 is a smartphone. Here, the user authentication application fails to obtain user authentication based on the selected user authentication device 130 (e.g., smart watch), and an indication of the failure is displayed on both the user's smartphone and the user's smart watch. This failure may be for a variety of reasons, such as the user is in a non-selected country, a wireless signal or beacon for the smart watch is not detectable, or the smart watch has not been authenticated, for example.

Figure 17:
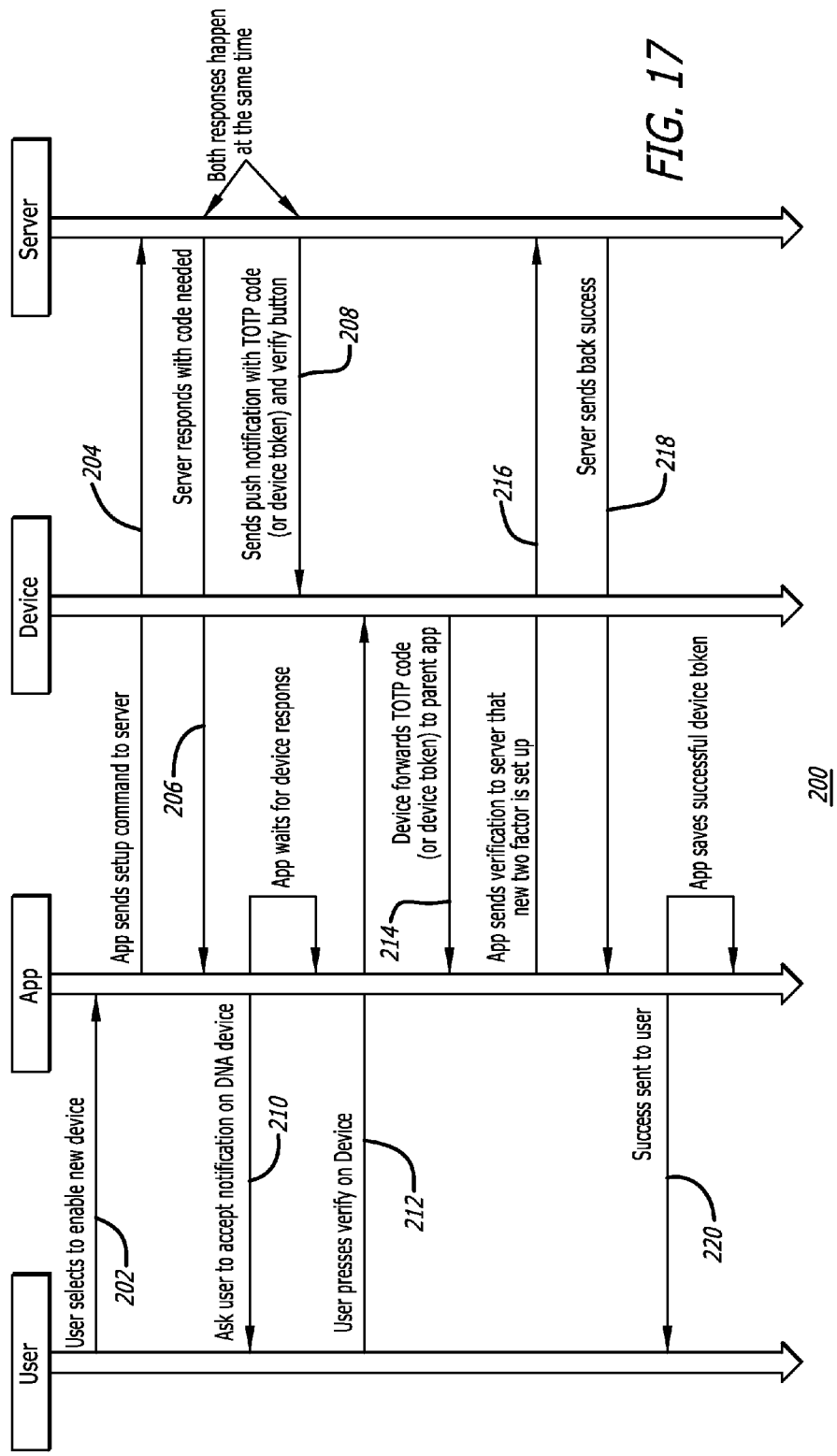
FIG. 17 is a flowchart illustrating a process for setting up a new device.

Turning to FIG. 17, a sequence diagram describing a process 200 by which a new user authentication DNA device is set up using a user authentication system is shown. In step 202, a user selects an option in a user authentication DNA application to enable a new device to be associated with the user for authentication purposes. For example, the user authentication DNA application may be an application that has been downloaded onto the user's mobile device (e.g., smartphone, tablet), or the user authentication DNA application may be a cloud-based application the user access through a web page on a server. The application sends a setup command to a server in step 204. In step 206, the server responds to the application with a code. The server also sends a push notification with a time-based one-time password (TOTP) code or device token and a verify selector (e.g., button) to the new user authentication DNA device in step 208. For example, both steps 206 and 208 may be done at the same time.

In step 210, the user is prompted by the user authentication application to accept notification on the new user authentication device, and the user authentication application waits for a response from the new user authentication device. The user selects or presses the verify selector on the new user authentication device in step 212. In step 214, the new user authentication device forwards the TOTP code or device token received from the server to the user authentication application. The user authentication application sends verification to the server that a new two-factor authorization is now set up for that device in step 216. In step 218, the server sends back to the user authentication application an indication that the new two factor authorization set up for that device is a success. The process ends in step 220 when the user authentication application saves the successful device token and provides an indication to the user that the new two factor authorization set up is a success.

As an example of process 200, the user authentication application may be an application on the user's smartphone, the new user authentication device may be a user's IoT device (e.g., smart watch, smart light bulb, smart thermostat, and the like), and the server may be a server operated by the entity that provides the user authentication application.

Figure 18:
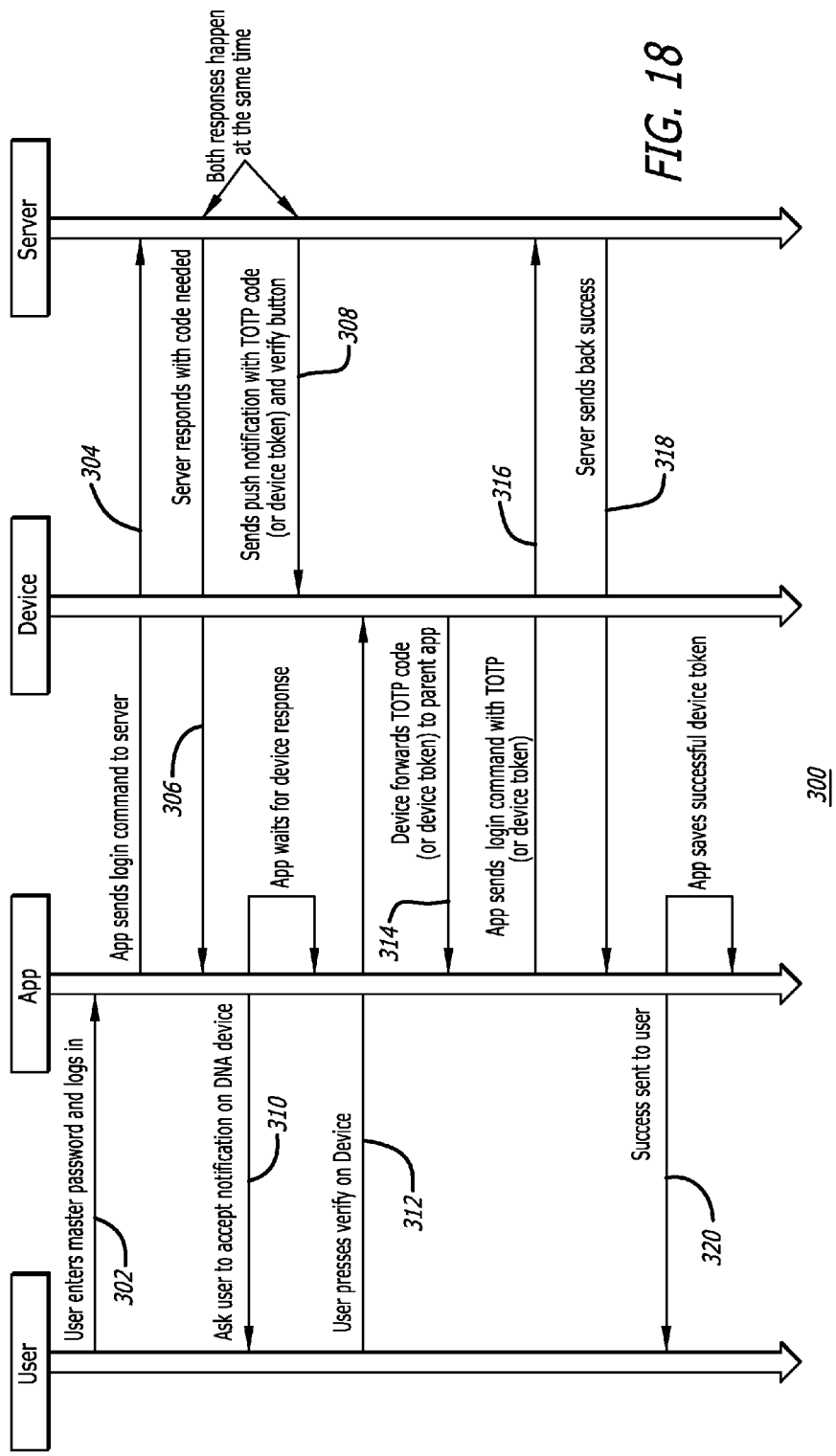
FIG. 18 is a flowchart illustrating a process for logging in with a new device.

FIG. 18 shows a sequence diagram describing a process 300 by which a user logs in to a secured application with a user authentication device previously set up using a user authentication system. In step 302, the user enters a master password on the user authentication application (e.g., on the user's smartphone). The user authentication application sends a log in command to a server in step 304. In steps 306 and 308 respectively, the server responds to the user authentication application with a code and the server sends a push notification with a TOTP code or device token and a verify selector to the user authentication device, where the steps may be performed at the same time by the server.

In step 310, the user is prompted by the user authentication application to accept notification on the user authentication device, and the user authentication application waits for a response from the user authentication device. The user selects or presses the verify selector on the user authentication device in step 312. In step 314, the user authentication device forwards the TOTP code or device token received from the server to the user authentication application. The user authentication application sends a log in command with the TOTP or device token to the server in step 316. In step 318, the server sends back to the user authentication application an indication that the user authenticated log in is a success. The process ends in step 320 when the user authentication application saves the successful device token and provides an indication to the user that the log in is a success.

Figure 19:
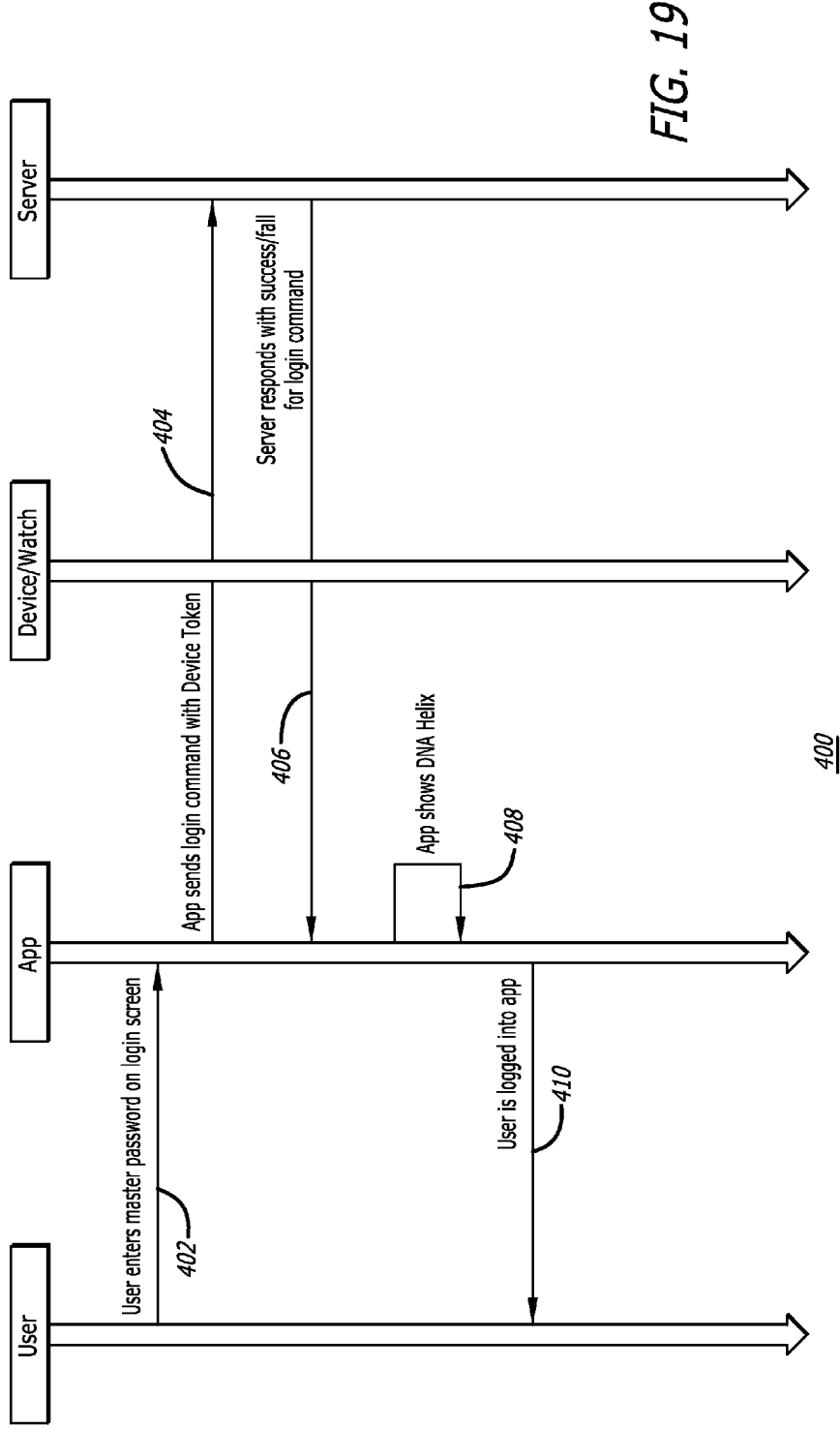
FIG. 19 is a flowchart illustrating a process for logging in with a device having a stored device token.

Turning to FIG. 19, a sequence diagram describing a process 400 for a log in flow of a user authentication device with a stored device token is shown. In step 402, the user enters a master password on the user authentication application (e.g., on the user's smartphone). The user authentication application sends a log in command with a stored device token to a server in step 404. In step 406, the server responds to the user authentication application with an indication of the success or failure of the log in command. The user authentication application displays a main application screen (e.g., a DNA helix) in step 408. In step 410, the user is successfully logged in to a secured application (e.g., a vault application). For example, the vault application may be a secured application for storing a user's sensitive information (e.g., computer log ins, credit card information, financial information, passwords, medical information, and the like).

Figure 20:
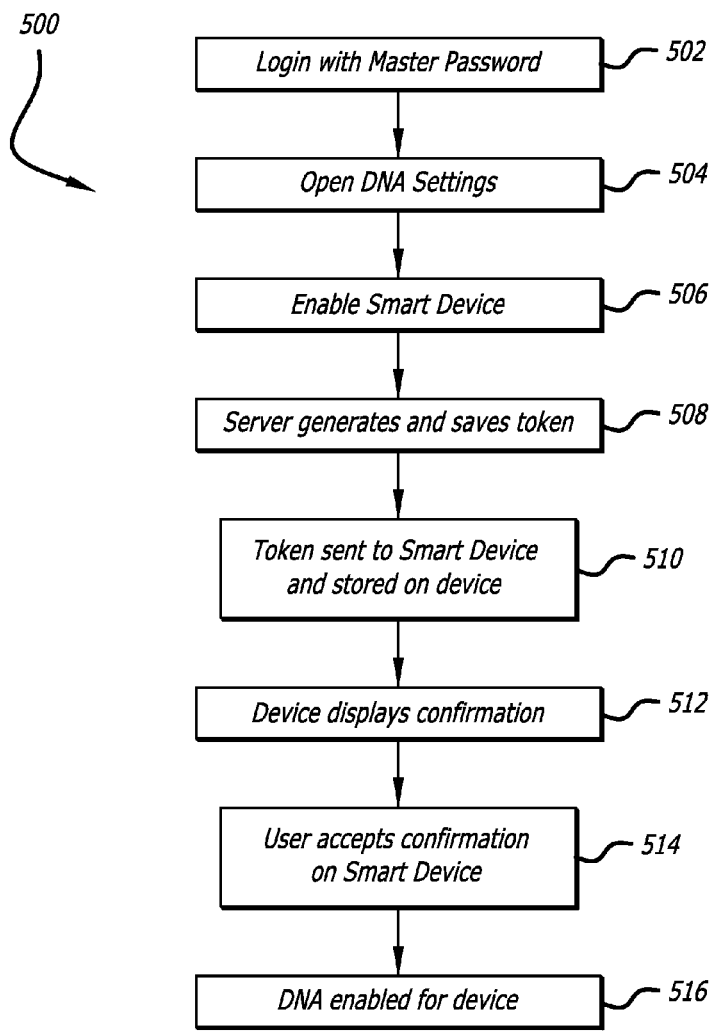
FIG. 20 is a flowchart illustrating a process for setting up an authentication device.

FIG. 20 shows a flow diagram describing a process 500 by which a user authentication device is set up using a user authentication system. In step 502, a user logs in with a master password, and opens user authentication settings in step 504. A smart device associated with the user is enabled in step 506, after which a server generates and saves a token in step 508. For example, a smart device may be any device that is able to transmit data (e.g., sensor, beacon). Other examples of smart devices may provide other features, such as being able to receive data, being able to store data, being able to process data, and the like. In step 510, the token is sent to and stored on the smart device, and the smart device displays a confirmation screen on the smart device in step 512. In step 514, the user accepts the confirmation on the smart device, after which user authentication is enabled for the smart device in step 516.

Figure 21:
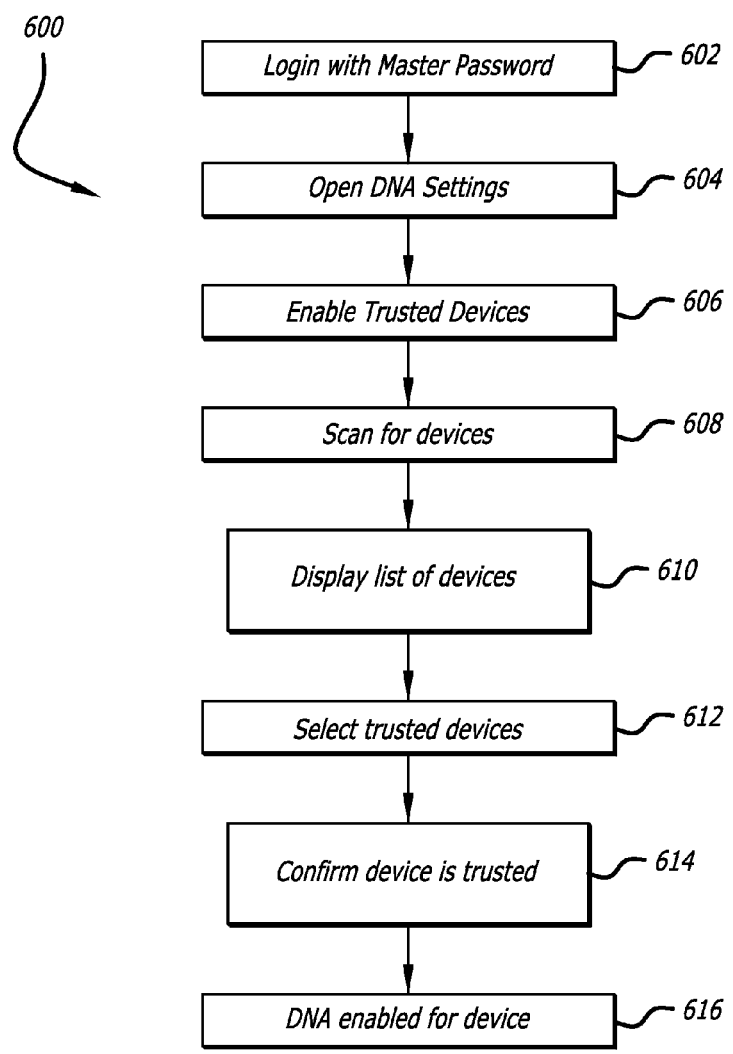
FIG. 21 is a flowchart illustrating a process for setting up an authentication beacon device.

FIG. 21 shows a flow diagram describing a process 600 by which a user authentication beacon device is set up using a user authentication system. Here, beacon devices may be Bluetooth LE devices, Wi-Fi devices, Zigbee devices, and the like, for example. In step 602, a user logs in with a master password, and opens user authentication settings in step 604. A trusted device associated with the user is enabled in step 606. A scan for devices is performed in step 608, and a list of found devices is displayed in step 610. In step 612, a trusted device or devices are selected from the list. In step 614, the selected device(s) are confirmed to be trusted, after which user authentication is enabled for the trusted device(s) in step 616.

Figure 22:
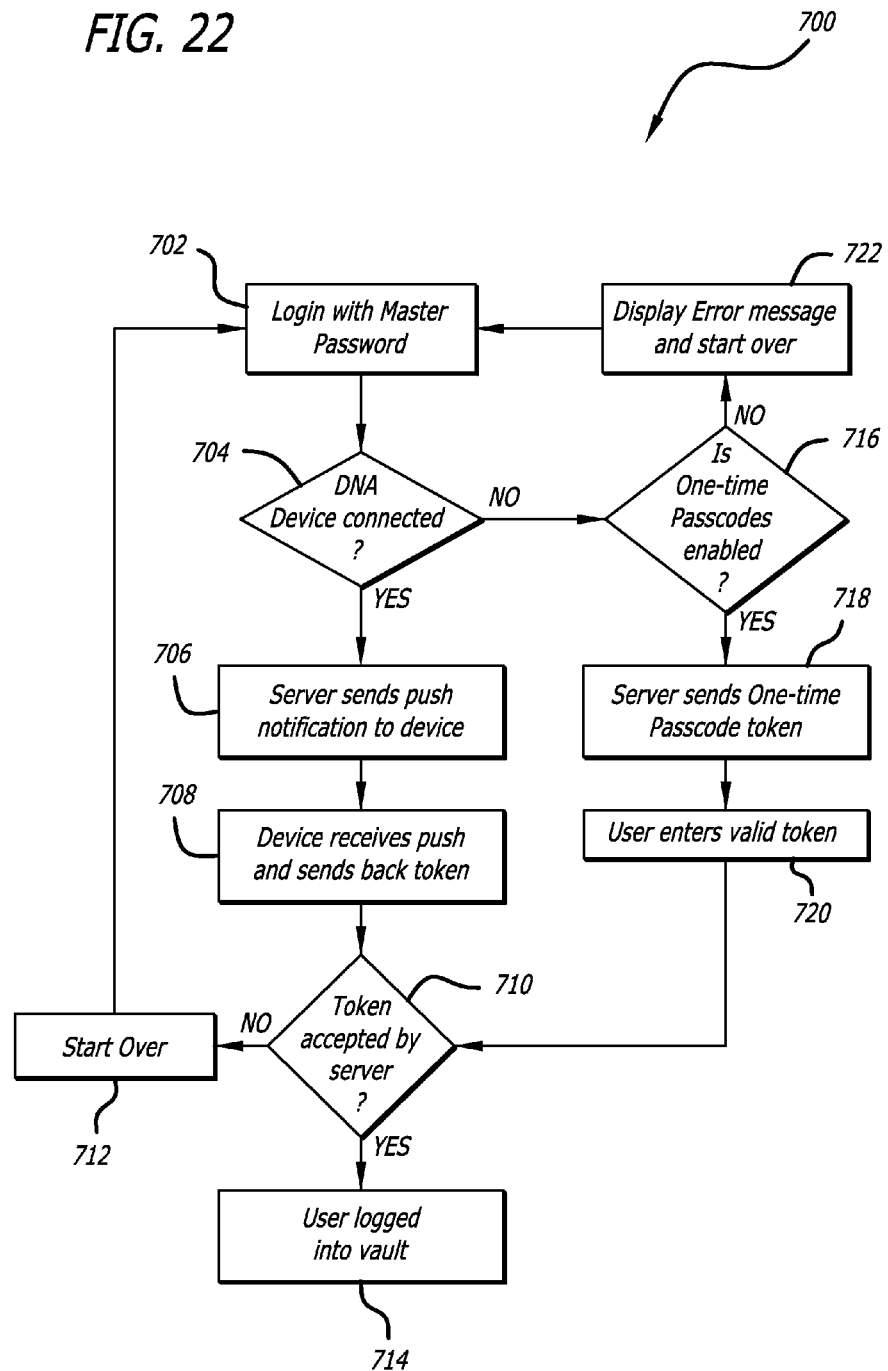
FIG. 22 is a flowchart illustrating a process for an authentication log in with a smart device.

Turning to FIG. 22, a flow diagram describing a process 700 for a user authentication log in flow for smart devices is shown. In step 702, the user logs in with a master password on a user authentication application (e.g., on the user's smartphone). In step 704, it is determined if a user authentication device is connected. If a user authentication device is connected, a server sends a push notification to the user's device (e.g., user's smartphone) in step 706. In step 708, the user device receives the push notification and sends back a token. In step 710, it is determined if the token is accepted by the server. If the token is not accepted by the server, the process starts over in step 712 (e.g., the user logs in with a master password in step 702). If the token is accepted by the server, the user is logged in to the secured application in step 714.

If the user authentication device is determined not to be connected in step 704, it is determined if a one-time passcode is enabled in step 716. If a one-time passcode is enabled, the server sends a one-time passcode token to the user in step 718. In step 720, the user enters a valid token and the process goes to step 710 where it is determined if the token is accepted by the server. If a one-time passcode is not enabled after step 716, an error message is displayed in step 722 and the process starts over again at step 702.

Figure 23:
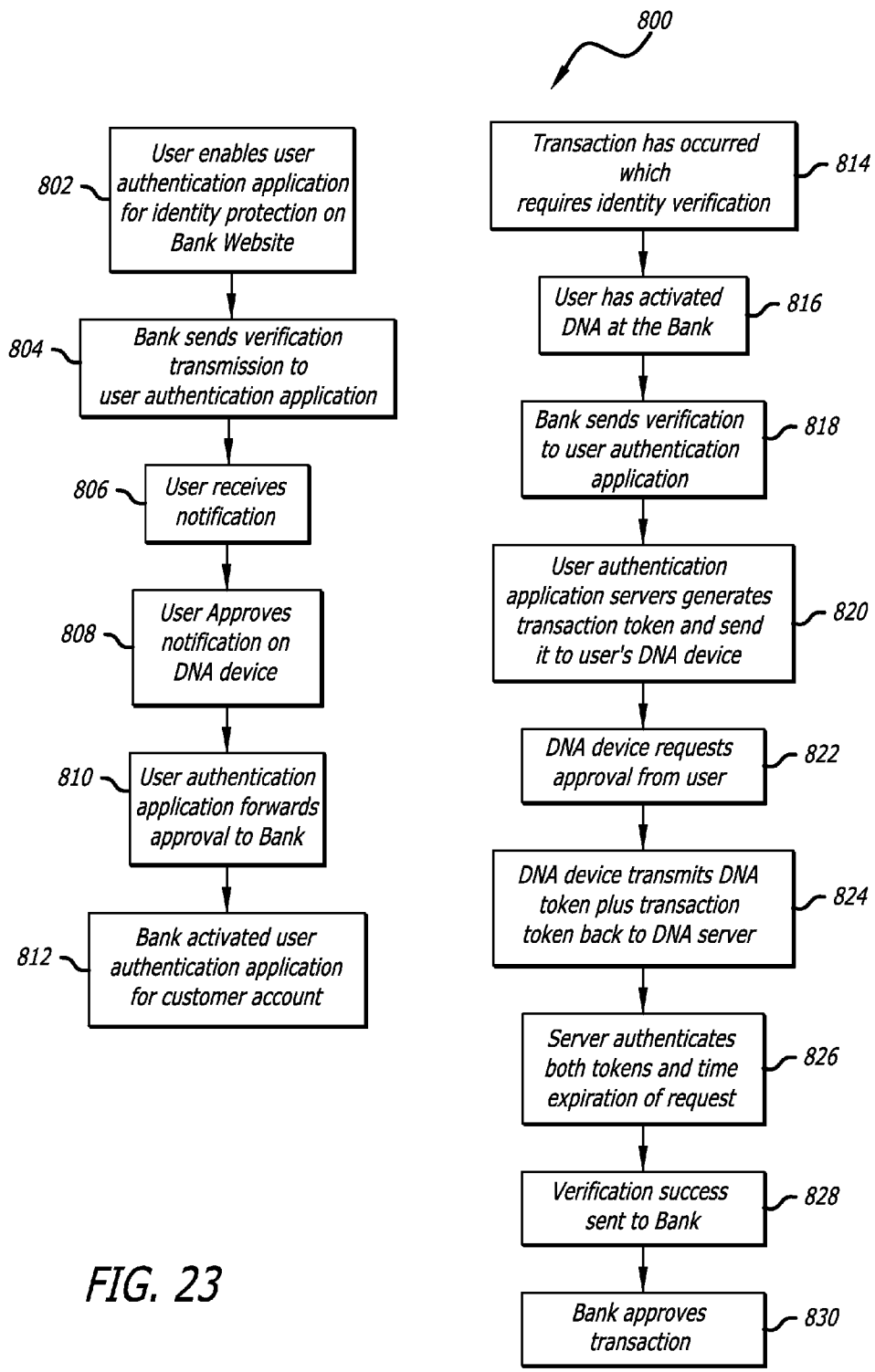
FIG. 23 is a flowchart illustrating a process for a third party identity verification using an authentication API.

FIG. 23 shows a flow diagram describing a process 800 for third party identity verification by a user authentication application program interface (API). In step 802, the user enables a user authentication application for identity protection on a third party website (e.g., a bank website). The third party sends a verification transmission to the user authentication application is step 804, and the user receives a verification notification in step 806. In step 808, the user approves the verification notification on a user authentication device, and the user authentication application forwards the user's approval to the third party in step 810. In step 812, the third party activates a user authentication identity for the user's account with the third party (e.g., the user's bank account). Steps 802 through 812 may be considered an initial sign-up process on the third party's website.

After the user is signed up, in one example, a transaction may occur that requires identity verification of the user by the third party in step 814 (e.g., a bank withdrawal). The third party determines the user has an activated user authentication identity in step 816, and the third party sends a verification request to the user authentication application in step 818. In step 820, a user authentication server generates a transaction token and sends the transaction token to a user authentication device associated with the user. In step 822, the user authentication device requests approval from the user. Upon user approval, the user authentication device transmits a token plus the transaction token back to the user authentication server in step 824. In step 826, the user authentication server authenticates the token and the transaction token, as well as a time expiration of the verification request. A verification success is sent to the third party in step 828, and the third party approves the transaction in step 830.

Figure 24:
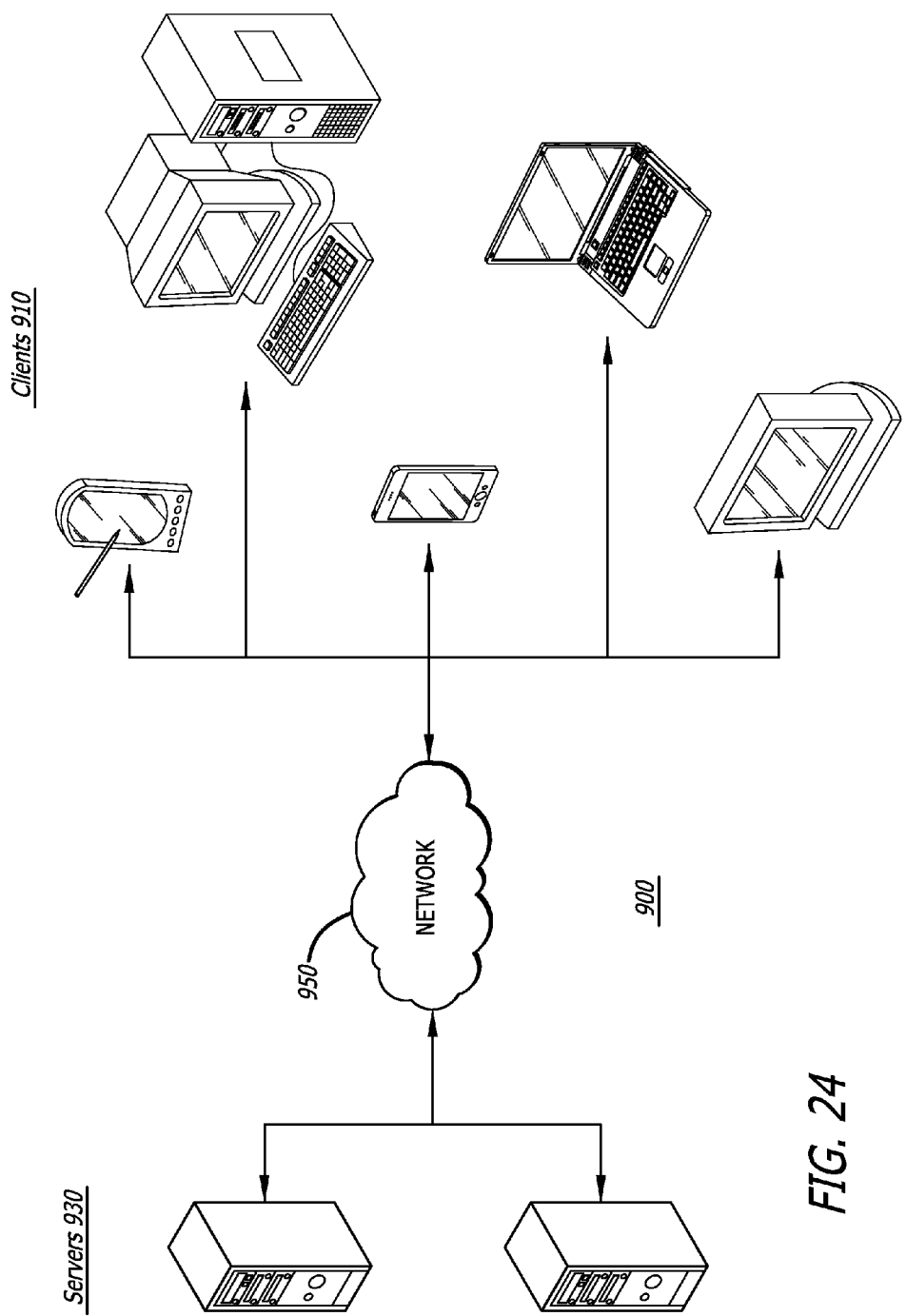
FIG. 24 is a block diagram illustrating an example client and server using the user authentication system of FIGS. 1-23.

FIG. 24 illustrates an architecture 900 for providing user authentication using the user authentication system. The architecture 900 includes servers 930 and clients (e.g., user devices) 910 connected over a network 950.

Each of the clients 910 is configured to run a web browser or other application that provides access to user authentication information. The web browser or other application is configured to run on clients 910 that are mobile or non-mobile. The clients 910 can be, for example, desktop computers, laptop computers, mobile devices (e.g., a smartphone, tablet computer, or PDA), set top boxes (e.g., for a television), video game consoles, IoT devices (e.g., smart light bulb, smart thermostat, smart TV), or any other devices having processor, memory, and communications capabilities.

The user authentication information can be downloaded over the network 950 from one or more servers 930. Multiple servers 930 can also host the data for calculating and/or downloading user authentication information. The servers 930 can be any device having processor, memory, and communications capabilities for calculating user authentication information and/or hosting data related to calculating user authentication information, such as data, signals, factors or formulas. The network 950 can include, for example, any one or more of a personal area network (PAN), a local area network (LAN), a campus area network (CAN), a metropolitan area network (MAN), a wide area network (WAN), a broadband network (BBN), the Internet, and the like. Further, the network 950 can include, but is not limited to, any one or more of the following network topologies, including a bus network, a star network, a ring network, a mesh network, a star-bus network, tree or hierarchical network, and the like.

Figure 25:
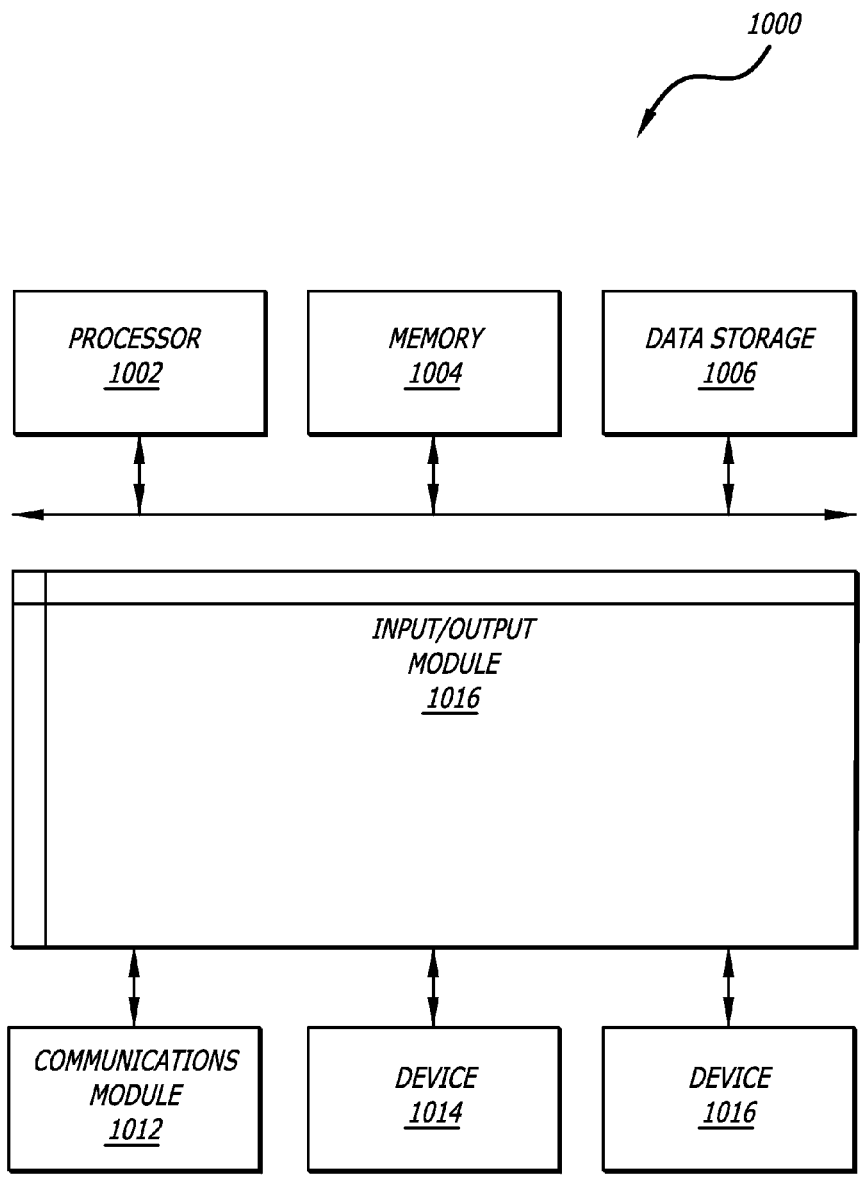
FIG. 25 is a block diagram illustrating a computer system with which the client of FIG. 24 can be implemented.

FIG. 25 is a block diagram illustrating an example computer system 1000 with which the client 910 and server 930 of FIG. 24 can be implemented. In certain aspects, the computer system 1000 may be implemented using hardware or a combination of software and hardware, either in a dedicated server, or integrated into another entity, or distributed across multiple entities.

Computer system 1000 (e.g., client 910 and server 930) includes a bus 1008 or other communication mechanism for communicating information, and a processor 1002 coupled with bus 1008 for processing information. By way of example, the computer system 1000 may be implemented with one or more processors 1002. Processor 1002 may be a general-purpose microprocessor, a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

Computer system 1000 can include, in addition to hardware, code that creates an execution environment for the computer program in question (e.g., code that constitutes processor firmware, a protocol stack, a database management system, an operating system, or a combination of one or more of them) stored in an included memory 1004, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device, coupled to bus 1008 for storing information and instructions to be executed by processor 1002. The processor 1002 and the memory 1004 can be supplemented by, or incorporated in, special purpose logic circuitry.

Computer system 1000 further includes a data storage device 1006 such as a magnetic disk, solid state disk (SSD) or optical disk, coupled to bus 1008 for storing information and instructions. Computer system 1000 may be coupled via input/output module 1010 to various devices. The input/output module 1010 can be any input/output module. Example input/output modules 1010 include data ports such as USB ports. The input/output module 1010 is configured to connect to a communications module 1012. Example communications modules 1012 include networking interface cards, such as Ethernet cards and modems. In certain aspects, the input/output module 1010 is configured to connect to a plurality of devices, such as an input device 1014 and/or an output device 1016. Example input devices 1014 include a keyboard and a pointing device, e.g., a mouse or a trackball, by which a user can provide input to the computer system 1000. Other kinds of input devices 1014 can be used to provide for interaction with a user as well, such as a tactile input device, visual input device, audio input device, or brain-computer interface device. For example, feedback provided to the user can be any form of sensory feedback (e.g., visual feedback, auditory feedback, or tactile feedback); and input from the user can be received in any form, including acoustic, speech, tactile, or brain wave input. Example output devices 1016 include display devices, such as a cathode ray tube (CRT) or liquid crystal display (LCD) monitor, for displaying information to the user.

According to an aspect of the present disclosure, the client 910 and server 930 can be implemented using a computer system 1000 in response to processor 1002 executing one or more sequences of one or more instructions contained in memory 1004. Such instructions may be read into memory 1004 from another machine-readable medium, such as data storage device 1006. Execution of the sequences of instructions contained in main memory 1004 causes processor 1002 to perform the process steps described herein. One or more processors in a multi-processing arrangement may also be employed to execute the sequences of instructions contained in memory 1004. In alternative aspects, hard-wired circuitry may be used in place of or in combination with software instructions to implement various aspects of the present disclosure. Thus, aspects of the present disclosure are not limited to any specific combination of hardware circuitry and software.

As used in this specification and any claims of this application, the terms "computer," "server," "processor," and "memory" all refer to electronic or other technological devices. These terms exclude people or groups of people. For the purposes of the specification, the terms display or displaying means displaying on an electronic device. As used in this specification and any claims of this application, the terms "computer-readable medium" and "computer-readable media" are entirely restricted to tangible, physical objects that store information in a form that is readable by a computer. These terms exclude any wireless signals, wired download signals, and any other transient signals.

To provide for interaction with a user, implementations of the subject technology described in this specification can be implemented on a computer system having a display device, e.g., a CRT (cathode ray tube), LCD (liquid crystal display), LED (light emitting diode), or DLP (digital light processing) monitor, for displaying information to the user and a keyboard and a pointing device, e.g., a mouse, a trackball, or a touchpad, by which the user can provide input to the computer system. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Aspects of the subject technology described in this specification can be implemented in a computing system that includes a back end component, e.g., as a data server, or that includes a middleware component, e.g., an application server, or that includes a front end component, e.g., a client computer having a graphical user interface or a web browser through which a user can interact with an implementation of the subject technology described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some aspects, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes may be rearranged, or that all illustrated steps be performed. Some of the steps may be performed simultaneously. For example, in certain circumstances, multitasking and parallel processing may be advantageous. Moreover, the separation of various system components in the aspects described above should not be understood as requiring such separation in all aspects, and it should be understood that the described program components and systems can generally be integrated together in a single system device or multiple devices.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology. Features described under one heading or one subheading of the subject disclosure may be combined, in various embodiments, with features described under other headings or subheadings. Further it is not necessarily the case that all features under a single heading or a single subheading are used together in embodiments.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa.

The word "exemplary" is used herein to mean "serving as an example or illustration." Any aspect or design described herein as "exemplary" is not necessarily to be construed as preferred or advantageous over other aspects or designs.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

What is claimed is:

1. A user authentication system comprising:
one or more processors;
one or more storage memories; and,
a user authentication module comprising instructions for causing the one or more processors to execute a method of a user authentication application for providing authentication of a user, the method comprising:
receiving, by the one or more processors of the user authentication application, a primary log in factor to be associated with a user;
receiving from a server a request verification of one or more smart devices to be associated with the user after the user has been verified by the one or more smart devices;
determining a user identification list of one or more smart devices being verified by the server with a device authenticator, wherein the user authentication application receives the device authenticator sent from the one or more smart devices for server verification;
receiving a request for authentication of the user;
determining if one or more of the verified smart devices on the user identification list are within a defined vicinity of the user; and, providing a user authentication if the primary log in factor provided with the request for authentication matches the primary log in factor associated with the user and one or more of the verified smart devices on the user identification list are within a defined vicinity of the user.

2. The system of claim 1, further comprising:
receiving, by one or more processors, a biometric factor to be associated with the user; and,
providing the user authentication if a biometric factor provided with the request for authentication matches the biometric factor associated with the user in addition to the primary log in factor matching and one or more of the smart devices being within the defined vicinity of the user.

3. The system of claim 1, wherein verification of a new smart device comprises:
receiving, by the user authentication application, a request to enable a new smart device;
receiving, by the user authentication application, a code from the server;
receiving, by the user authentication application, a device authenticator from the new smart device after the user has been verified by the new smart device;
receiving, by the user authentication application, confirmation from the server that a two factor authentication is complete; and,
saving, by the user authentication application, the device authenticator.

4. The system of claim 3, wherein the device authenticator is a device token.

5. The system of claim 3, wherein the device authenticator is a time-based one-time password (TOTP) code.

6. The system of claim 1, wherein the user identification list comprises a plurality of verified smart devices located within a plurality of geographic locations.

7. The system of claim 1, further comprising:
providing, by one or more processors, access to a secured application based on receiving the user authentication.

8. The system of claim 1, further comprising:
providing, by one or more processors, confirmation of the user authentication to a third party.

9. The system of claim 1, wherein verification of a new smart device comprises:
enabling a trusted device;
scanning for device beacons;
selecting the trusted device from a list of devices found by the scan;
confirming the selected trusted device is trusted; and,
adding the trusted device to the user identification list.

10. The system of claim 1, further comprising:
receiving, by one or more processors, a listing of approved locations; and,
not providing the user authentication if the request for authentication originates from a location not on the approved location listing.

11. The system of claim 1, further comprising:
receiving, by one or more processors, a listing of approved Wi-Fi networks; and,
not providing the user authentication if the request for authentication originates from a network not on the approved Wi-Fi networks listing.

12. The system of claim 1, further comprising:
providing, by one or more processors, an alternative authentication method if no smart devices on the user identification list are determined to be within the defined vicinity of the user.

13. The system of claim 12, wherein the alternative authentication method comprises:
sending, by one or more processors, an authentication code to the user by one of a text message, a voice call, or a vendor authentication device;
receiving, by one or more processors, a code from the user; and
providing, by one or more processors, a user authentication if the primary log in factor provided with the request for authentication matches the primary log in factor associated with the user and the code received from the user matches the authentication code.

14. A user authentication system comprising:
a user authentication server;
a user device;
a user authentication device; and,
a user authentication application comprising instructions for causing the server, the user device and the one or more authentication devices to execute a method for providing authentication of a user, the method comprising:
inputting, on the user device, a log in request and a primary log in factor;
sending, from the user device, the log in request and primary log in factor to the user authentication server;
sending, from the user authentication server, a push notification with a device token to the user authentication device, which is separate from the user device, for requesting verification of the user authentication device, the user device receiving the device token sent from the user authentication device for server verification;
sending, from the user device, the device token to the user authentication server after the user is verified by the user authentication device; and,
sending, by the user authentication server, a user authentication if the primary loci in factor and the device token are acceptable to the user device.

15. The system of claim 14, wherein the primary log in factor is a password.

16. The system of claim 14, wherein the primary log in factor is a biometric factor associated with the user.

17. The system of claim 14, further comprising verification of a new user authentication device by:
receiving, by the user authentication application, a request to enable a new user authentication device;
receiving, by the user authentication application, a code from the server;
receiving, by the user authentication application, a device authenticator from the new user authentication device after the user has verified the new user authentication device;
receiving, by the user authentication application, confirmation from the server that a two factor authentication is complete; and,
saving, by the user authentication application, the device authenticator.

18. The system of claim 17, wherein the device authenticator is a device token.

19. The system of claim 17, wherein the device authenticator is a time-based one-time password (TOTP) code.

20. The system of claim 14, further comprising
a plurality of user authentication devices located within a plurality of geographic locations.

21. The system of claim 14, further comprising:
providing confirmation of the user authentication to a third party.

22. The system of claim 14, further comprising verification of a new user authentication device by:
- enabling a trusted device;
- scanning for device beacons;
- selecting the trusted device from a list of devices found by the scan;
- confirming the selected trusted device is trusted; and,
- adding the trusted device to a list of user authentication devices associated with a user.

23. The system of claim 14, further comprising:
- receiving a listing of approved locations; and,
- not providing the user authentication if the log in request originates from a location not on the approved location listing.

24. The system of claim 14, further comprising:
- receiving a listing of approved Wi-Fi networks; and,
- not providing the user authentication if the log in request originates from a network not on the approved Wi-Fi networks listing.

25. The system of claim 14, further comprising:
- providing an alternative authentication method if the token is not acceptable.

26. The system of claim 25, wherein the alternative authentication method comprises:
- sending an authentication code to a user by one of a text message, a voice call, or a vendor authentication device;
- receiving a code from the user; and
- providing a user authentication if the primary log in factor provided with the log in request matches a primary log in factor associated with the user and the code received from the user matches the authentication code.

27. The post transaction order modification system of claim 14, wherein the user authentication is sent to the user device and further comprising:
- providing, on the user device, access to a secured application.

28. A non-transitory machine-readable storage medium comprising machine readable instructions for causing a processor to execute a method for providing authentication of a user, the method comprising:
- receiving, by the processor, a request for authentication of the user from a user device;
- determining if a password provided with the request for authentication matches the master password associated with the user;
- sending a push notification with a device token to a user authentication device, which is separate from the user device, for requesting verification of the user authentication device, the user device receiving the device token sent from the user authentication device for server verification, a user authentication server receiving the device token from the user device after the user is verified by the user authentication device;
- determining if the user authentication device is within a defined vicinity of the user;
- providing a user authentication if the password provided with the request for authentication matches the master password associated with the user and the user authentication device associated with the user is within a defined vicinity of the user; and,
- providing, on a display of the user device, an access screen of a secured application.

29. The non-transitory machine-readable storage medium of claim 28, further comprising machine readable instructions for:
- associating an additional authentication device with the user by:
  - providing, on the display, a selector for adding an authentication device;
  - receiving, by the processor, a code;
  - providing, on the additional authentication device, a verification selector;
  - receiving, by the processor, a device authenticator from the additional authentication device after the user has activated the verification selector on the additional authentication device; and,
  - saving, in a memory, the device authenticator in association with the user.

30. The non-transitory machine-readable storage medium of claim 28, further comprising machine readable instructions for:
- associating an additional authentication device with the user by:
  - enabling a device associated with the user;
  - scanning for device beacons in the vicinity of the user;
  - selecting the device associated with the user from a list of devices found by the scan;
  - confirming the selected device is a trusted device; and,
  - adding the trusted device to a list of authentication devices associated with the user.

31. The non-transitory machine-readable storage medium of claim 28, further comprising machine readable instructions for:
- providing the user authentication only if the request for authentication originates from a location on a user approved location listing.

32. The non-transitory machine-readable storage medium of claim 28, further comprising machine readable instructions for:
- providing the user authentication only if the request for authentication originates from a network on a user approved Wi-Fi networks listing.

* * * * *